Patented July 20, 1926.

1,593,040

UNITED STATES PATENT OFFICE.

DONALD R. STEVENS AND SAMUEL P. MARLEY, OF PITTSBURGH, AND WILLIAM A. GRUSE, OF WILKINSBURG, PENNSYLVANIA, ASSIGNORS TO GULF REFINING COMPANY, OF PITTSBURGH, PENNSYLVANIA, A CORPORATION OF TEXAS.

PROCESS OF IMPROVING MOTOR FUEL.

No Drawing. Application filed December 28, 1925. Serial No. 77,930.

This invention relates to processes of improving motor fuel; and it comprises a method of improving the qualities of gasoline, kerosene and other motor fuel as regards knocking wherein material containing an aluminum halide, such as aluminum chlorid, or its reaction products, is extracted with an organic solvent and the solvent used for extraction is added to the motor fuel in small amount; the material containing aluminum chlorid or its reaction products being advantageously one which has been treated with, or has reacted upon, hydrocarbons; all as more fully hereinafter set forth and as claimed.

It is well recognized that commercial motor fuels, such as gasoline, leave considerable to be desired as regards knocking; and particularly when used in engines with high compression or engines which are dirty. Many methods have been described, and some are in use, for obviating this knocking tendency in whole or in part. Tetraethyl lead was used for a time and was quite effective. Anilin is another body which can be added to motor fuel to restrain knocking, but the proportions required are commonly rather high. Benzene or benzol also restrains knocking but the proportions required are higher than with anilin.

We have found that various organic liquids after contact with aluminum chlorid when added to gasoline and kerosene have a substantial knock reducing power. Knocking is usually estimated on an arbitrary scale; this scale being different with different apparatus. In the apparatus we employ, a maximum knock is indicated by 20° on this scale. Gasoline which gave a knock of 20° in this apparatus upon an addition of 2 per cent of benzene, which had been in contact with aluminum chlorid gave a knock reduced from 20 to 15. The solubility of aluminum chlorid in benzene is very small and in the 2 per cent of solution added to gasoline the weight was inappreciable. Nevertheless, there was a substantial reduction in knock. The addition of untreated benzene alone in the amount of 2 per cent gave no appreciable reduction in knock. Whether it was aluminum chlorid in solution, or a reaction product of aluminum chlorid upon benzene, giving the effect is not known. In nitrobenzene, aluminum chlorid is somewhat soluble; the solution however being almost completely precipitated on admixture with gasoline. It has been found that by making a 10 per cent solution of aluminum chlorid in nitrobenzene, and adding 2 parts by volume to 98 parts of gasoline, there is a large precipitation of aluminum chlorid; not more than 0.1 per cent of aluminum chlorid staying in solution. On freeing the gasoline of precipitated matter, the gasoline showed a substantial reduction in knock.

The property of being affected in some way by aluminum chlorid so as to acquire knock-restraining value is quite general with combustible organic liquids. In some cases, as with alcohol, acetone and ether, contact with aluminum chlorid results in the formation of true double compounds. These compounds, which are described in the literature, are relatively stable and may be isolated. They are more soluble in gasoline, or mixtures containing gasoline, than is aluminum chlorid itself. It is possible to retain in solution in a mixture of 95 per cent gasoline and 5 per cent alcohol, some 0.8 per cent of such a compound formed by the interaction of aluminum chlorid and ethyl alcohol. The solution gives less knock than the gasoline-alcohol mixture alone. Similar results have been obtained with double compounds of aluminum chlorid with ether and with acetone.

In addition to the above effects noted for solutions of aluminum chlorid and of double compounds of aluminum chlorid with organic compounds of the type of alcohol, it has been found that marked effects may be obtained by employing solutions of the products which are formed in bringing aluminum chlorid into contact with hydrocarbon materials of the type of petroleum products. For example, anhydrous aluminum chlorid may be treated with liquid gasoline in the cold and the gasoline removed. The residual aluminum chlorid or sludge remaining on being contacted with the various liquids before stated, now gives them an increased knock restraining activity. If the treatment of the aluminum chlorid with liquid gasoline instead of being done in the cold is done hot, as by refluxing gasoline with the aluminum chlorid for a time, the treated aluminum chlorid or reaction product gives even more active properties to extracting solvents with which it is contacted. Instead of using gasoline for treating aluminum chlorid to impart to it the described property, various other petroleum oils such as gas oil, kerosene, etc. may be used. In each case, the aluminum chlorid so treated subsequently imparts greater activity to liquids contacted with it and subsequently used in admixture with gasoline.

Used aluminum chlorid sludges and cokes from petroleum refineries resulting from aluminum chlorid methods of making gasoline and of purifying oil, give results analogous to those just described with regard to aluminum chlorid treated with hydrocarbons. These sludges and cokes result from the contacting of aluminum chlorid with petroleum oils which are practically entirely hydrocarbon in character. The residues contain aluminum chlorid either as such, or as hydrocarbon derivatives. A sludge resulting from the reaction of gas oil and aluminum chlorid in the manufacture of gasoline on extraction with solvent naphtha gave a solution containing aluminum, but no chlorin. This solution showed a knock-reducing tendency when added in small proportions to gasoline.

Practically any combustible organic liquid not injurious to gasoline may be used for the present purposes. The action is better with non-hydrocarbon liquids. We have used ether, alcohol, methyl-alcohol, nitrobenzene, acetone, solvent naphtha and tetraline.

Where, as in the case of nitrobenzene mentioned ante, mixture of the extract with the gasoline produces a precipitate, this precipitate is removed.

The action of the other aluminum halides (aluminum bromid and aluminum iodid) is similar to that of aluminum chlorid. Either the bromid or the iodid may be used in lieu of the chlorid in the examples given.

While we have spoken more specifically of gasoline, we regard our process as applicable to other volatile oily petroleum products used as motor fuel and susceptible of improvement as regards knocking quality, whatever the commercial name of such a liquid may be. Extracts made in the manner described may, for example, be added to kerosene and various naphthas.

What we claim is:—

1. The process of improving motor fuel as regards knocking qualities which comprises treating a material containing an aluminum halide with a combustible organic liquid, removing the liquid and adding such liquid product to motor fuel.

2. The process of improving motor fuel as regards knocking qualities which comprises treating a material containing aluminum chlorid with a combustible organic liquid, removing the liquid and adding such liquid product to motor fuel.

3. The process of improving motor fuel as regards knocking qualities which comprises treating aluminum chlorid with a hydrocarbon, extracting the so-treated aluminum chlorid with a combustible organic liquid and adding the extract to motor fuel to be employed.

4. In the improvement of motor fuel as regards knocking qualities, the process which comprises extracting material containing aluminum chlorid with the aid of a combustible organic liquid, adding the extract to the motor fuel and separating any precipitate which may form.

In testimony whereof we hereunto affix our signatures.

DONALD R. STEVENS.
SAMUEL P. MARLEY.
WILLIAM A. GRUSE.